United States Patent [19]
Gallas

[11] Patent Number: 5,187,207
[45] Date of Patent: * Feb. 16, 1993

[54] MELANIN HYDROPHILIC CONTACT LENSES

[75] Inventor: James M. Gallas, San Antonio, Tex.

[73] Assignee: Photoprotective Technologies, Inc., San Antonio, Tex.

[*] Notice: The portion of the term of this patent subsequent to Oct. 6, 2004 has been disclaimed.

[21] Appl. No.: 454,094

[22] Filed: Dec. 19, 1989

Related U.S. Application Data

[63] Continuation-in-part of Ser. No. 255,905, Oct. 6, 1988, abandoned, Ser. No. 105,631, Oct. 5, 1987, abandoned, Ser. No. 105,632, Oct. 5, 1987, abandoned, and Ser. No. 88,029, Aug. 18, 1987, abandoned, which is a continuation of Ser. No. 837,852, Mar. 6, 1986, abandoned, which is a continuation of Ser. No. 739,756, May 30, 1985, abandoned, which is a continuation of Ser. No. 618,745, Jun. 8, 1984, abandoned, said Ser. No. 255,905, is a continuation-in-part of Ser. No. 105,632, , said Ser. No. 105,631, is a continuation-in-part of Ser. No. 88,029, , and Ser. No. 739,556, , which is a continuation-in-part of Ser. No. 618,745.

[51] Int. Cl.$^5$ ............................................. C08L 89/04
[52] U.S. Cl. .................................... 523/106; 359/350; 359/356; 359/361; 351/160 H; 351/165; 351/162; 351/163; 8/507; 8/509; 8/512; 8/647; 8/678; 8/673; 252/582; 252/583; 252/587; 252/588; 428/412; 428/441; 526/238.1; 526/259; 526/314; 527/201; 527/202; 527/203; 528/205; 528/329.1

[58] Field of Search .................. 523/106; 8/507, 509, 8/512, 678, 673, 647; 252/582, 583, 587, 588; 428/412, 441; 526/238.1, 259, 314; 527/201, 202, 203; 359/350, 356, 361; 351/160, 163, 165, 162; 528/205, 329

[56] References Cited

U.S. PATENT DOCUMENTS

| | | | |
|---|---|---|---|
| 2,822,339 | 2/1958 | Hagemeyer, Jr. | 526/238.1 |
| 3,322,719 | 5/1967 | Pielstocker | 350/1.1 |
| 3,764,477 | 9/1973 | Lehmann et al. | 527/201 |
| 4,404,257 | 9/1983 | Olson | 428/412 |
| 4,419,405 | 12/1983 | Ashby et al. | 428/412 |
| 4,464,525 | 8/1984 | Vance | 528/392 |
| 4,650,605 | 3/1987 | Vance | 252/589 |

FOREIGN PATENT DOCUMENTS 1389087 1/1965 France .
9071149 10/1974 Japan .
1060780 3/1967 United Kingdom .

OTHER PUBLICATIONS

Today-San Antonio, Jun. 1984.
The Merck Index (10th Edition pp. 206, 827 and 1154).
Hackh's Chemistry Dictionary (4th Edition) pp. 413 and 698.
Organic Chemistry, pp. 428, 429, 576, 577 and 579 Karrer, (1950).

Primary Examiner—Joseph L. Schofer
Assistant Examiner—Alex H. Walker
Attorney, Agent, or Firm—A. Triantaphyllis

[57] ABSTRACT

A hydrophilic contact lens is disclsoed incorporating melanin that protects the eye from harmful radiation and superoxide.

41 Claims, 1 Drawing Sheet

MELANIN HYDROPHILIC CONTACT LENSES

RELATED APPLICATIONS

This application is a continuation-in-part application of copending application Ser. No. 07/105,631, filed Oct. 5, 1987 now abandoned, which is a continuation-in-part application of application Ser. No. 06/739,556, filed May 30, 1985, now U.S. Pat. No. 4,698,374, issued Oct. 6, 1987, which in turn is a continuation-in-part application of application Ser. No. 06/618,745, filed Jun. 8, 1984, now abandoned. Application Ser. No. 07/105,631 is also a continuation-in-part application of copending application Ser. No. 07/088,029, filed Aug. 18, 1987 now abandoned, which in turn is a continuation application of application Ser. No. 06/837,852, filed Mar. 6, 1986, now abandoned, which in turn is a continuation application of application Ser. No. 06/739,756, filed May 30, 1985, now abandoned, which in turn is a continuation application of application Ser. No. 06/618,745, filed Jun. 8, 1984, now abandoned. This application is also a continuation-in-part application of copending application Ser. No. 07/088,029. This application is also a continuation-in-part application of copending application Ser. No. 07/105,632, filed Oct. 5, 1987, now abandoned, which is a continuation-in-part application of application Ser. No. 06/739,556 and a continuation-in-part application of copending application Ser. No. 07/088,029. This application is also a continuation-in-part application of copending application Ser. No. 07/255,905, filed Oct. 6, 1988, now abandoned, which is a continuation-in-part application of copending application Ser. No. 07/105,632. The Copending applications referenced above are incorporated herein and are made part hereof by reference.

TECHNICAL FIELD

The present invention relates to the field of opthalmic devices and, more particularly, to hydrophilic contact lenses commonly known as hydrogel or soft contact lenses. Still more particularly, the present invention relates to a hydrophilic contact lens incorporating melanin that protects the eye from harmful radiation and superoxide.

BACKGROUND OF THE INVENTION

Radiation emitted from artificial or natural sources is one of the major causes of opthalmic damage including formation of cataracts and tissue damage in the retina, the lens and the cornea. It is believed that a portion of the damage to the cornea and probably the lens is attributed to superoxide being formed in the cornea as a result of the reaction of oxygen with biological molecular units of the cornea being brought to an electronically excited state by light reaching the cornea.

With respect to retinal damage and cataract formation, it is known that, although the cornea and the lens of the eye absorb a large portion of the ultra-violet rays emitted from the radiation source, a substantial portion of the radiation in the range of wavelengths between 400 and 550 nanometers reaches the retina and causes photochemical damage. The amount and severity of the damage increases exponentially as the wavelength of the radiation decreases towards 400 nanometers. The correlation between retinal damage and wavelength is defined herein as the action spectrum for retinal damage.

In the past, various opthalmic devices were developed to absorb radiation. Although some of those devices were able to filter out ultra-violet radiation, most of those devices cut out the ultra-violet wavelengths abruptly as do cut off filters, while allowing radiation between the wavelengths of 400 and 550 nanometers to go through and adversely affect the eye. Furthermore, nobody has attempted to reduce the effects of the superoxide being formed in the cornea and the vicinity thereof.

The present invention discloses an apparatus and a method for absorbing radiation throughout the ultra-violet, visible and infra-red region, including radiation in the wavelengths between 400 and 550 nanometers. Furthermore, it discloses an apparatus and a method for absorbing radiation throughout the entire ultra-violet, visible and infra-red spectrum with the amount of radiation being absorbed increasing as the wavelength increases whereby the absorption is proportionately higher in the regions wherein the effect of radiation is more harmful. Furthermore, the present invention discloses a method and apparatus for reducing the perceived harmful effects of superoxides present in the cornea by scavenging those superoxides. The apparatus and method utilize a hydrophilic contact lens which includes melanin in a non-aggregated form. The melanin provides an absorption spectrum throughout the entire ultra-violet, visible and infra-red region which is similar to the action spectrum for retinal damage. Furthermore, the melanin scavenges the superoxide that is present in the vicinity of the cornea and prevents it from adversely reacting with excited biological tissue. Although melanin has been disclosed in the past as a sunscreen mixed in a cosmetic cream applied to the skin in Japanese Patent 74 71,149 to Kokai, that melanin was in aggregated form and not suitable for the apparatus and the method of the present invention.

These and other advantages over the present invention will become apparent from the following description and drawing.

SUMMARY OF THE INVENTION

A hydrophilic contact lens is disclosed. The lens contains melanin that absorbs radiation throughout the entire ultra-violet, visible and infra-red spectrum with the amount of absorption being uniformly increased as the wavelength of the radiation decreases. Accordingly, the amount of absorption of radiation by the lens uniformly and continuously increases as the amount and severity of potential harm to the eye increases. Furthermore, the melanin scavenges superoxide anions that are present in the vicinity of the cornea of the eye, thereby acting as a superoxide dismutase. Unless it is scavenged, superoxide may have a harmful effect on the eye by damaging the tissue.

The lens is prepared by polymerizing well known hydrophilic monomers. The melanin is incorporated into the lens by either adhering it to the surface of the lens or by incorporating it into the matrix or lattice of the lens. One method of preparing the melanin-containing lens entails first, the separate preparation of the melanin and of the clear hydrophilic lens without the melanin followed by the step of adhering the melanin to the lens by physical or chemical means. It is preferred, that the adherence of the melanin to the lens be accomplished by direct or indirect chemical covalent bonding between the melanin and certain hydrophilic exoskeletal functional groups that are present on the backbone of the polymeric lens. Another method for preparing the melanin-containing hydrophilic lens entails the physical or chemical combination of separately prepared melanin with a monomer suitable for the preparation of a hydrophilic lens, followed by the free-radical polymerization of the monomer to form the melanin-containing hydrophilic lens having non-aggregated melanin uniformly dispersed in the lattice of the lens. Like the previous method, it is preferred that the melanin and the monomer be combined via a chemical covalent bond, directly or indirectly, through appropriate nucleophilic and electrophilic functional groups. Still another method for preparing the melanin containing contact lens entails the copolymerization of a hydrophilic monomer and a melanin precursor by a free-radical initiator.

BRIEF DESCRIPTION OF THE DRAWINGS

For a description of the invention, reference will now be made to the accompanying FIG. 1, wherein the relative transmission of radiation by melanin versus the wavelength of the radiation is shown.

DETAILED DESCRIPTION OF THE INVENTION

Figure 1:
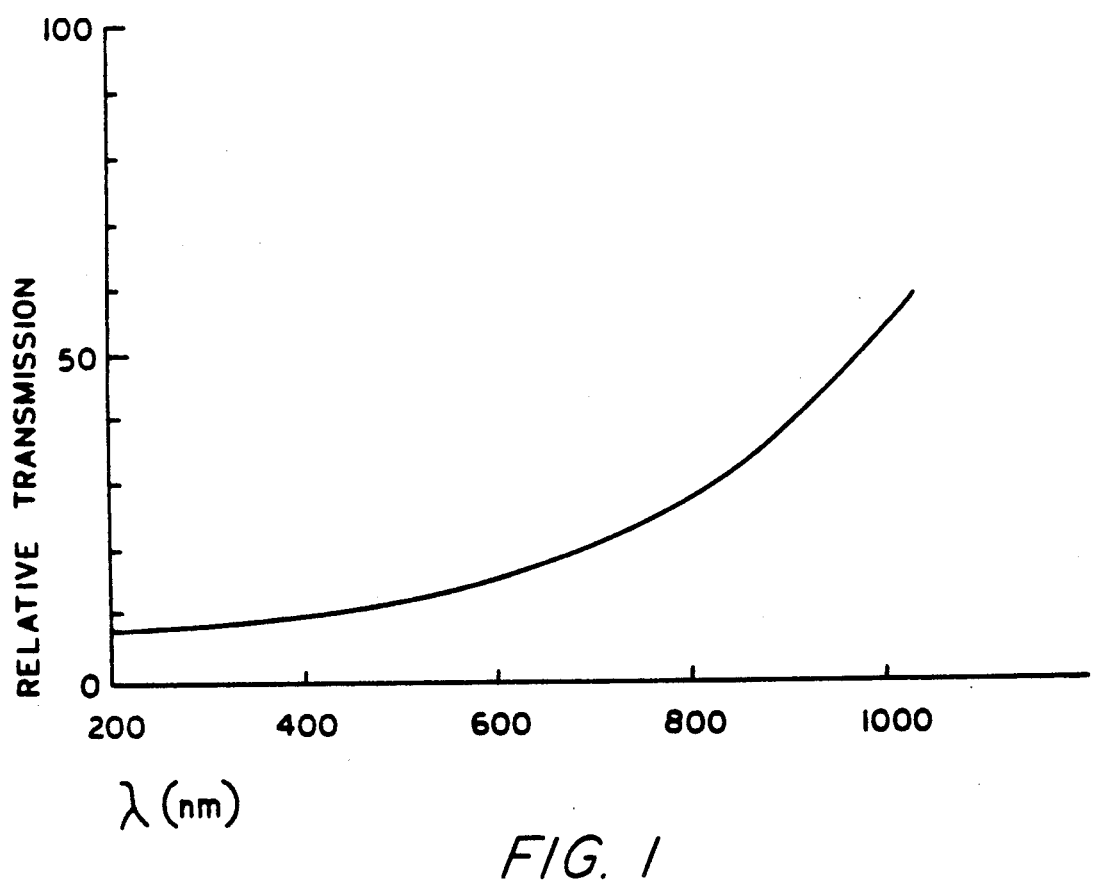

According to the present invention, a hydrophilic contact lens is disclosed that includes melanin for protecting the eye by acting as a superoxide dismutase agent and by filtering out or absorbing ultra-violet, visible and near infrared radiation. As a result, photochemical damage to the retina, the lens and the cornea of the eye is reduced. The lenses may be prepared with or without an optical prescription for correcting visual defects. Furthermore, the lens may be prepared for either an external or intraocular application.

It is well known that, although the cornea and the lens of the eye absorb most of the damaging rays of the sun or other natural or artificial sources of radiation, including rays belonging in the ultra-violet region, there is a considerable amount of radiation in the wavelength ranging from between 400 and 550 nanometers which reaches the retina and causes photochemical damage. It is also well known that the magnitude and the severity of the damage is increased exponentially as the wavelength of radiation is decreased towards 400 nanometers.

Referring now to FIG. 1, there is shown the relative transmission of radiation by melanin versus the wavelength of the radiation. This graph also shows indirectly the amount of radiation absorbed by melanin versus the wavelength of the radiation. Other graphs showing the optical absorption of melanin and a comparison of its optical absorption with that of other substances can be found in R. A. Nicolaus, *Melanins* (1968), published by Hermann, Paris, France, (hereinafter referred to the "Nicolaus Book"). Those graphs and the information contained in that book relating to melanins is incorporated herein by reference.

It is clearly shown in FIG. 1 that the amount of radiation absorbed by the melanin continuously and uniformly increases as the wavelength of the radiation decreases from the higher wavelengths to the wavelengths wherein the amount of damage is the highest. Because the probability, amount or severity of retinal damage increases exponentially as the wavelength is decreased from the higher wavelengths toward 400 nanometers, it is apparent, that the absorption spectrum of melanin is very similar to the action spectrum for the retinal damage or, alternatively, that the percentage of radiation absorbed by melanin increases in the wavelength region wherein the potential of retinal damage increases.

It is also believed by certain authorities in the field, that photochemical damage to the cornea is promoted by oxygen that is present in the cornea or in its vicinity. That oxygen dependence has been disclosed by Zuchlich, Photochem. Photobiol., Volume 25, pages 133–135 (1977). Furthermore, it is believed that when biological molecules are exposed to short wavelength ultra-violet and blue radiation, reactions may occur with oxygen to produce superoxide. Superoxide is also formed by the reaction of oxygen with free melanin radicals that are produced when melanin absorbs light. The term superoxide as used herein is defined as the radical anion of molecular oxygen and is symbolized as $O_2\tilde{v}$.

It is believed that superoxide is extremely reactive and harmful to biological tissue. Melanin has the ability to react with the superoxide, thereby preventing it from damaging the cornea and/or the lens of the eye. Melanin acts as a superoxide dismutase, i.e., a chemical agent that renders the superoxide harmless through chemical reaction, or a scavenging agent that scavenges the superoxide (superoxide-scavenging agent). The melanin is particularly suited as a superoxide dismutase, not only because of its chemical structure, but also, because of the chemical properties of the superoxide. More particularly, superoxide can function either as a chemical oxidant or as a reductant. Because melanin is a redox polymer, it may function in a similar fashion. Accordingly, superoxide is reduced by melanin through one reaction and is oxidized by melanin through another reaction.

The reduction by melanin reaction is:

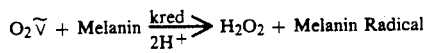

The oxidation by melanin reaction is:

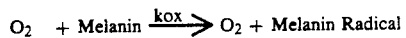

Because the hydrogen peroxide being produced by the reduction of superoxide by melanin tends to bleach the melanin and to oxidize the cornea, it is preferred that an agent be present to decompose the hydrogen peroxide to oxygen and water. Such an agent is copper in the form of ions ($CU^{++}$) bound to the melanin polymer as ligands or chelates. These ions decompose the hydrogen peroxide to oxygen and water. Accordingly, one may prevent the bleaching of the melanin in the lens by incorporating those ions into the lens and by bathing the lens in a copper sulphate solution to replenish the $CU^{++}$ ions that are being converted to $CU^+$ ions. This solution would also function as a bacteriostat for the lens.

A hydrophilic contact lens comprising a polymeric material and a scavenging agent for scavenging the superoxide is disclosed. Such scavenging agent or superoxide dismutase is a melanin or other superoxide dismutases. Examples of such superoxide dismutases include, but are not limited to, superoxide dismutases listed on page 1348 of the 1989 catalog of Sigma Chemical Company, entitled *Biochemical Organic Compounds* for Research and Diagnostic Reagents (hereinafter the "Catalog"). The superoxide dismutases listed therein are extractions from bovine (cow) erythrocytes, extractions from bovine kidney, and extractions from bovine liver. These extractions are commercially available in free form or chemically bonded to polyethylene glycol. The sections of the Catalog referring to superoxide dismutases are incorporated herein and are made part hereof by reference.

For the purpose of the present description, melanins are defined and classified in the Nicolaus Book. The entire information contained in that book is incorporated herein by reference. As defined in that book, melanins constitute a class of pigments which are widespread in the animal and vegetable kingdoms. While the name melanin in Greek means black not all melanins as pigments are black but may vary from brown to yellow. Melanins are classified in three groups, namely eumelanins, phaeomelanins and allomelanins. Eumelanins are derived from the precursor tyrosine shown as Compound (1), whereas phaeomelanins are derived from the precursors tyrosine or cysteine shown as Compound (2).

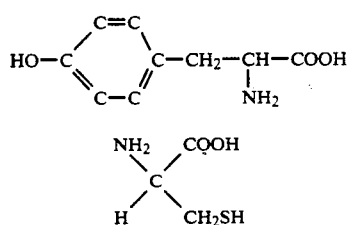

Allomelanins, i.e., other melanins, are formed from nitrogen-free precursors, such as catechol and 1,8-dihydroxynapthalene. Further information on melanins is found and incorporated herein by reference on page 827, Monograph No. 5629 in The Merck Index (10th Ed. 1983).

Melanin is produced in nature by the free radical polymerization of the precursors. Furthermore, melanin may be synthesized commercially or in the laboratory from precursors through the free radical polymerization of these precursors. Examples of synthetically produced melanins from catechol or DOPA precursors are found in the article Froncisz, Sarna, Hyde, *Copper (2+) ion Probe of Metal -ion Bindino Sites in Melanin Using Electron Paramagnetic Resonance Spectroscopy. I. Synthetic Melanins.* Arch. Biochem. Biophys., 1980, 202(1) and 289-303. That article is incorporated herein by reference. According to that article, melanin is produced from catechol as follows:

*Catechol Melanin.* A solution of 15 g of catechol in 3 L of deionized water was brought to pH 8 with ammonium hydroxide, and then air was bubbled through the stirred solution for four days. The resulting melanin was precipitated by addition of concentrated hydrochloric acid to bring the pH to 2, then washed with dilute HCl and dialyzed against deionized water for several days to remove $H^+$ and $Cl^-$ ions. The concentration of the melanin suspension was estimated by drying an aliquot in vacuum over phosphorus pentoxide and weighing. Oxidized catechol melanin was prepared by adding 10 mL of $10^{-3}$ M potassium ferricyanide to 30 mg of melanin and incubating for 10 minutes. The suspension was then spun down, washed twice with deionized water and suspended in 5 mL of deionized water.

Because of the number of reactive sites in the melanin precursors and their intermediates, the polymerization of the precursors is heterogeneous and the result is an amorphous, highly irregular, three dimensional polymer whose structure cannot be characterized or defined. Furthermore, the number of melanin precursor units in the polymer is not ascertainable. In order to overcome this difficulty, a given melanin is characterized primarily by its precursor and the spectroscopic properties of the melanin rather than by an exact determination of the structure and chemical formula thereof. Accordingly, a melanin is characterized as follows:

1. a polymer of a monomeric melanin precursor
2. a polymer whose monomeric precursors polymerize via a free-radical mechanism
3. a polymer with a broad band optical absorption spectrum as shown in FIG. 1
4. a polymer with a stable free-radical which is often studied through ESR spectrocopy
5. an amorphous, three dimensional, heterogeneous polymer of varying molecular weight.

This characterization is adopted to define the melanins in this invention.

In the present invention the preferred melanin precursors are DOPA (compound (3)) and dopamine (compound (4)) which form eumelanins and catechol (compound (5)) which form allomelanin.

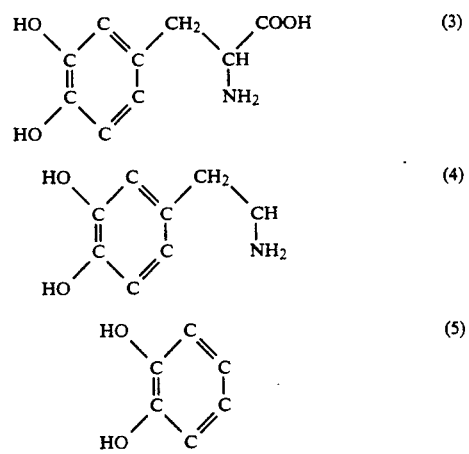

Other known melanin precursors which may be used in the present invention are 5,6-dihydroxyindole; leucodopachrome; tryptamine; serotonin; 5,6-dihydroxyindole-2- carboxylic acid; epinephrine; norepinephrine; tyrosine, adrenochrome; and 1,8-dihydroxynapthalene.

In the past, synthetic melanins were prepared by using oxygen to initiate the free-radical polymerization of the precursor in a base and water solution. According to the present invention, however, the polymerization reaction may also be initiated in solvents other than water using a free-radical initiator. The free-radical initiator is chosen by considering its solubility properties and the desired reaction kinetics. The most preferred free-radical initiator is benzoyl peroxide. Other preferred free-radical initiators are di-tert-butyl peroxide and di(1-cyano-1-methyl ethyl) diazene (azobisisobutyronitrile). Still other initiator systems include other peroxides, azo compounds, redox pairs, photochemical systems, perborates, percarbonates and radiation. The solvents that may be used, other than water, are organic solvents, such as dimethyl sulfoxide (DMSO), chloroform, toluene, acetonitrile, methylene chloride, 1,2-dichloroethane, etc.

According to the present invention, three methods are preferred for preparing a melanin containing hydrophilic contact lens. In the first method, previously prepared melanin is adhered to a previously prepared clear hydrophilic contact lens. The melanin is prepared by well-known techniques utilizing a melanin precursor. Examples of such preparation are disclosed and described in U.S. patent application Ser. No. 06/739,556, which is incorporated herein by reference and in the aforementioned book by Nicolaus. The clear hydrophilic contact lens is prepared by polymerizing well-known hydrophilic monomers routinely used in the preparation of hydrophilic, i.e., soft, contact lenses. The hydrophilic properties of those monomers are attributed to the presence of —OH and —COOH functional groups. Examples of such monomers are 2-hydroxyethyl methacrylate, otherwise known as HEMA, and methacrylic acid. It should be noted that melanin has hydrophilic properties, also. According to this method, the melanin is applied or adhered to the surface of the lens by contacting that surface with the melanin. The melanin may be applied to the interior surface of the contact lens, i.e., the surface adjacent to the cornea, the exterior surface thereof, both surfaces, or portions thereof. It should be understood, however, that, in order to utilize the melanin as a superoxide dismutase, the melanin must be applied to, at least, the interior surface of the lens, whereby the melanin is placed in the vicinity of the superoxide formation area.

Although melanin may be adhered to the surface of the clear lens by any well known physical or chemical techniques, it is preferred that a procedure be used wherein a chemical covalent bond is formed between the polymeric material of the clear hydrophilic lens and the melanin to produce a chemically stable, heat resistive lens that is not susceptible to leaking or bleeding when the lens is sterilized. This is accomplished by preparing the hydrophilic lens by polymerizing at least one monomer that contains one or more nucleophilic functional groups capable of reacting with the melanin after the polymerization of the monomer. Common nucleophilic functional groups present in hydrophilic contact lens material are the carboxyl, hydroxyl, amino, amido and mercapto groups. Monomers bearing those functional groups include, but are not limited to, hydroxyalkyl esters of polymerizable unsaturated acids, such as acrylic, methacrylic, itaconic, fumaric and maleic acids. One of those esters that has been used extensively for the preparation of hydrophilic lenses is 2-hydroxyethyl methacrylate (HEMA).

Because the presence of these exoskeletal functional groups alone is not sufficient to initiate and complete the covalent bond between the melanin and the polymeric material, coupling agents are utilized to activate either the functional groups that are present in the polymeric backbone or the functional groups that are present in the melanin. Those coupling agents include, but are not limited to, carboxyl activating reagents such as substituted carbodimide bis-substituted phosphinic chlorides, carbonyl diimidazoles, activating esters, acid halides, and anhydrides. The activated carboxyl groups on the polymer backbone of the hydrophilic lens will couple with amino or hydroxyl groups on the melanin to produce chemically stable, heat resistive ester or amide covalent linkages. Alternatively, activated carboxyl groups present on the melanin couple with hydroxyl, amino, amido or mercapto functional groups present on the polymer backbone. Either alternative can be employed to covalently couple melanin to a hydrophilic lens polymeric material.

If it is desirable to produce a melanin containing hydrophilic lens being tinted in the center of the lens and having a clear untinted edge, well known techniques such as the one disclosed in U.S. Pat. No. 4,553,975 may be used to seal the area of the lens that must remain clear and to expose the unsealed areas to the melanin for tinting.

In certain instances it may not be desirable or possible to form a covalent bond directly between the melanin and the functional groups on the backbone of the polymer because such bond is sterically hindered. Instead, aliphatic, aromatic or combined aliphatic and aromatic linkage or cross-linking agents may be used. These cross-linking agents have on one end of the linking arm, an activated group, such as a carboxyl derivative, isothiocyanate or other electrophilic species suitable for forming a chemical bond with the functional groups that are present on the polymer backbone and, on the other end, a nucleophilic group, such as hydroxyl, amino, amido, mercapto or carboxyl, that is suitable for forming a covalent bond with the activated melanin in the form of an amide, ester, or ether.

A variety of dyes may be used together with melanin to vary the degree of coloration of the contact lens. Although many well known methods of incorporating dye in hydrophilic contact lenses may be used, it is preferred, that reactive dyes that contain nucleophilic functional groups capable of forming covalent bonds with the exoskeletal functional groups of the lens be used together with coupling reagents that are similar to the ones referred to hereinabove. It should be noted that non-reactive dyes are not desirable because they form ether linkages.

Melanin-containing hydrophilic contact lenses may also be prepared by contacting or mixing, melanin that is separately prepared, as previously described, with a monomer that is suitable for the preparation of hydrophilic polymeric material before the monomer is polymerized, in a suitable solvent such as dimethyl sulfoxide, chloroform, toluene, acetonitrile, methylene chloride, 1,2-dichloroethane, etc. The mixture is then polymerized by free-radical polymerization to form a hydrophilic contact lens wherein the melanin is uniformly dispersed throughout the matrix or lattice of the lens. In order to obtain a stable lens, it is preferred, that the monomer contain the previously described functional groups that are suitable for the formation of covalent bonds, directly or indirectly, between the monomer and the melanin. More particularly, the precursor must contain carboxyl, hydroxyl, amino, amido or mercapto groups that can form covalent bonds with melanin, directly or through the use of cross-linking agents, following activation by coupling activating agents that were previously described. In the preparation of the melanin-containing lens by this method, as well as in the preparation by the previous method, the degree of melanin incorporation may be controlled by varying the contact time and/or the relative reactivity of the reagents A melanin containing hydrophilic lens may also be prepared according to the present invention by incorporating melanin into the lens as a co-polymer. More particularly, a melanin precursor is dissolved in a liquid monomer that is suitable for the preparation of a hydrophilic polymeric material. An initiator suitable for initiating the co-polymerization reaction of the melanin and the monomer is added and the solution is heated. Suitable initiators include th aforementioned initiators of the polymerization reaction of melanin precursors such as benzoyl peroxide, etc. The resultant product is a solid, visibly transparent, hydrophilic lens having melanin uniformly dispersed therein in a non-aggregated form.

As discussed above, a melanin may be incorporated in the lattice of the lens and/or applied to the surface of the lens to act as a radiation absorbing pigment and to protect the eye from such radiation. In order to scavenge the superoxide that is present on the surface of the eye, a melanin or any other superoxide dismutase may be applied to the surface of the lens and/or may be incorporated in the lattice of the lens to have sufficient physical and chemical contact with the superoxide. The superoxide is able to reach or make contact with the superoxide dismutase by diffusion through the aqueous channels or network existing within the structure of the hydrophilic contact lens. The superoxide dismutase scavenges such superoxide as described above. For example, a hydrophilic lens may be dipped in an aqueous or other solution of a melanin or in a aqueous solution of the superoxide dismutases which are extractions of bovine erythrocytes, kidney or liver to physically attach the superoxide dismutase to the surface of the lens. Similarly, a superoxide dismutase such as the ones described above may be physically or chemically incorporated in the lattice of the lens and/or chemically or physically attached to the surface of the lens.

The following examples further illustrate the invention, but are not to be construed as limitations on the scope of the apparatus and the method contemplated herein.

EXAMPLE 1

A hydrophilic contact lens previously prepared by the polymerization of 2-hydroxyethyl methacrylate (HEMA) was soaked in a 1.0 M Sodium Carbonate solution. The lens was then washed with deionized water and was placed into a solution (0.2 milliliters) composed of previously prepared melanin (0.2 grams) and 1-ethyl-3-(3-dimethylaminopropyl) carbodiimide (0.35 grams) in a phosphate buffer solution, having a pH of 7.8. The lens remained in the solution for two hours at room temperature and melanin adhered to the lens. Following, the melanin containing lens was washed with a neutral buffered (pH of 7) saline solution until the solution showed no absorption at 400 mls. The melanin - HEMA lens was washed with methanol and again examined for leaching of melanin. The final lens was boiled in distilled water for one hour to remove any traces of methanol. The lens was stored in a sterile buffered saline solution. The resultant lens was a fully tinted, optically clear lens having an absorption spectrum substantially similar to the one shown in FIG. 1. This is a theoretical example.

EXAMPLE 2

The previous procedure was repeated except for the fact that the edges of the lens were covered by a device that sealed those edges from exposure to the melanin and the activating reagent. The resultant product was a lens having a tinted center and a clear edge. This is a theoretical example.

EXAMPLE 3

Benzoyl peroxide (150 milligrams) was added to 2-hydroxyethyl methacrylate (10 milliliters). The mixture was poured into a test tube, sealed and heated to 55° C. for 24 hours. The resultant product was a clear, transparent, soft, hydrophilic plastic. Thin plastic strips having a thickness of about 1 millimeter were cut out from the plastic and were placed into a concentrated solution of low molecular weight melanin granules prepared as in Example 4. The system was then heated at 90° C. for 24 hours. At the end of that period the system was cooled. The strips of hydrophilic plastic were imbedded with melanin. This is a theoretical example.

EXAMPLE 4

Benzoyl peroxide (2.6 grams) was dissolved in acetonitrile (150 milliliters). The solution was heated to 65° C. Catechol (6.0 grams) was then dissolved in the solution and was followed by the addition of triethyl amine (1.5 milliliters). The solution was continuously heated at 65° C. for about 16 hours. At the end of that period, the solution was cooled and then filtered with a 0.4 micron filter paper. The filtered content was poured in open dishes and the acetonitrile was allowed to evaporate. The residue was a concentrated solution of low molecular weight melanin granules. The procedure up to that point was actually performed. The remaining procedure is a theoretic example. Melanin residue (8.0 grams) was dissolved in 2-hydroxyethyl methacrylate liquid (40 milliliters). Then 1-ethyl-3-(3-dimethylaminopropyl) carbodiimide (2.0 grams) was added and the mixture was stirred for 24 hours to form a solution. A portion of that solution (10 milliliters) was combined with 2-hydroxyethyl methacrylate (30 milliliters). Then the mixture was filtered. Then benzoyl peroxide (1.5 grams) was added. The solution was heated for 20 hours at 60° C. The resultant product was a transparent melanin colored soft contact lens having a relative transmission spectrum substantially similar to the one shown in FIG. 1.

EXAMPLE 5

Benzoyl peroxide (2.6 grams) was dissolved in acetonitrile (150 milliliters) The solution was heated to 65° C. Catechol (6.0 grams) was then dissolved in the solution and was followed by the addition of triethyl amine (1.5 milliliters). The solution was continuously heated at 65° C. for about 16 hours. At the end of that period, the solution was cooled and then filtered with a 0.4 micron filter paper. Filtered material (5.0 milliliters) was mixed with 1-ethyl-3(3-dimethylaminopropyl) carbodiimide (130 milligrams). Following the mixture was combined with 2-hydroxyethyl methacrylate liquid (10 milliliters). Furthermore azobisisobutyronitrile (300 milligrams) was added to the mixture. The resultant mixture was heated in an oven at 60° C. The acetonitrile was evaporated and the 2-hydroxyethyl methacrylate monomer was polymerized to incorporate the melanin into the matrix and to form a melanin-containing thin soft contact lens.

EXAMPLE 6

Benzoyl peroxide (150 milligrams) was dissolved in 2-hydroxyethyl methacrylate monomer (10 milliliters). L-Dopa (15 milliliters) was also dissolved in the monomer. The solution was poured into a test tube, sealed and heated at 55° C. for 24 hours. The result was a solid, soft, gel-like plastic with a red to brown color that was optically clear and transparent. The absorption spectrum of the plastic was substantially similar to the absorption spectrum of melanin shown in FIG. 1

Although the invention is described with respect to specific embodiments and modifications, the details hereof are not to be construed as limitations, except to the extent indicated in the following claims.

What is claimed is:

1. A hydrophilic contact lens, comprising:
   a polymeric material; and
   a scavenging agent for scavenging a superoxide coming into contact with the scavenging agent, the scavenging agent being connected to the polymeric material.

2. A hydrophilic contact lens according to claim 1 wherein the scavenging agent is melanin.

3. A hydrophilic contact lens according to claim 2 wherein the melanin is produced by the polymerization of a melanin precursor.

4. A hydrophilic contact lens according to claim 1 wherein the scavenging agent absorbs ultraviolet, visible and infrared radiation.

5. A hydrophilic contact lens according to claim 1 wherein the scavenging agent reduces the superoxide to hydrogen peroxide.

6. A hydrophilic contact lens according to claim 5 further including a second agent that decomposes the hydrogen peroxide to oxygen and water.

7. A method of reducing damage to the eye caused by superoxide, comprising the step of scavenging the superoxide with a superoxide-scavenging agent being incorporated into a hydrophilic contact lens.

8. A method according to claim 7 wherein the scavenging agent is melanin.

9. A method according to claim 8 wherein the melanin is formed from the polymerization of a melanin precursor.

10. A method according to claim 7 wherein the scavenging agent is adhered to the surface of the lens that is adjacent to the eye.

11. A method according to claim 14 wherein the scavenging agent is incorporated into the lattice of the lens.

12. A transparent and optically clear contact lens, comprising:
    a hydrophilic polymer; and
    a superoxide-scavenging agent attached to the polymer.

13. A contact lens according to claim 5 wherein the superoxide scavenging agent is melanin formed from a melanin precursor.

14. A contact lens according to claim 12 wherein the superoxide-scavenging agent is a superoxide dismutase that scavenges a superoxide.

15. A contact lens according to claim 12 wherein the agent reduces the superoxide by a first reaction and oxidizes the superoxide by a second reaction.

16. A contact lens according to claim 6 wherein the second agent is $CU^{++}$ ions.

17. A method according to claim 7 wherein the scavenging agent is an extraction from bovine erythrocytes, bovine kidney or bovine liver.

18. A contact lens according to claim 12 wherein the superoxide-scavenging agent is melanin.

19. A hydrophilic contact lens, comprising a transparent filter for filtering radiation, the filter including an absorbing pigment formed from the polymerization of a melanin precursor.

20. A hydrophilic contact lens according to claim 19 wherein the absorbing pigment is melanin.

21. A hydrophilic contact lens according to claim 19 wherein the filter includes a polymeric material and the absorbing pigment is connected to the polymeric material.

22. A hydrophilic contact lens according to claim 21 wherein the pigment is attached to the surface of the polymeric material.

23. A hydrophilic contact lens according to claim 21 wherein the pigment is incorporated into the matrix of the lens.

24. A hydrophilic contact lens according to claim 1 further including melanin.

25. A hydrophilic contact lens according to claim 1 further including an absorbing pigment.

26. A hydrophilic contact lens according to claim 25 wherein the absorbing pigment is the scavenging agent.

27. A method for reducing damage to the eye caused by superoxide, comprising the step of scavenging the superoxide with a superoxide-scavenging agent being incorporated into a hydrophilic contact lens.

28. A method according to claim 27 wherein the scavenging agent is melanin.

29. A method according to claim 27 wherein the scavenging agent is formed from the polymerization of a melanin precursor.

30. A method according to claim 27 wherein the scavenging agent is adhered to the surface of the lens that is adjacent to the eye.

31. A method according to claim 27 wherein the scavenging agent is incorporated into the matrix of the lens.

32. A transparent and optically clear contact lens, comprising a hydrophilic polymer which includes material formed from a melanin precursor.

33. A contact lens according to claim 32 wherein the polymer includes melanin.

34. A contact lens according to claim 32 wherein the contact lens includes an agent for scavenging superoxide.

35. A contact lens according to claim 34 wherein the agent both reduces and oxidizes the superoxide.

36. A contact lens according to claim 1 further including an agent that decomposes superoxide.

37. An article of manufacture prepared by a process comprising the step of:
    applying melanin to the surface of a hydrophilic contact lens.

38. An article of manufacture prepared by the process according to claim 37 wherein the melanin is in a non-aggregated form.

39. An article of manufacture prepared by the process comprising the step of:
    incorporating melanin into the matrix of a hydrophilic polymer.

40. An article of manufacture prepared by the process according to claim 39 wherein the incorporating step includes the steps of:
    combining melanin with a hydrophilic monomer; and
    polymerizing the monomer.

41. An article of manufacture prepared by the process according to claim 39 wherein the incorporating step includes the steps of:
    combining a melanin precursor with a hydrophilic monomer; and
    copolymerizing the precursor and the monomer.

* * * * *